Oct. 20, 1925.

W. G. HARRIS 1,557,833

HAND PROPELLED TRUCK, TROLLEY, AND THE LIKE

Filed Sept. 5, 1922   2 Sheets-Sheet 1

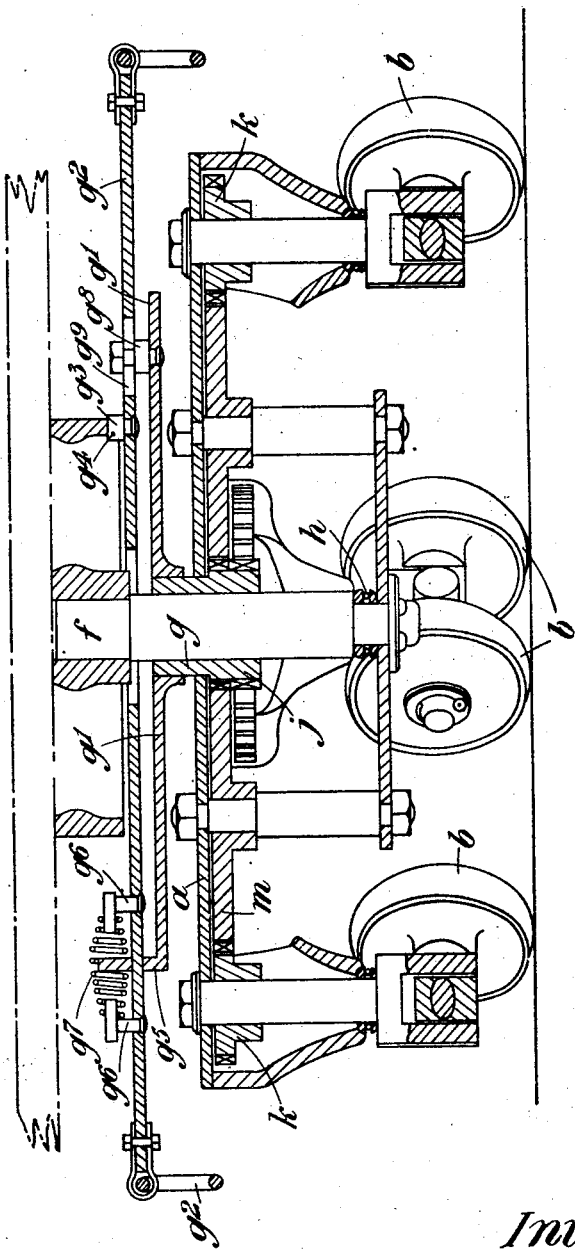

Patented Oct. 20, 1925.

1,557,839

UNITED STATES PATENT OFFICE.

WILLIAM GEORGE HARRIS, OF BRISTOL, ENGLAND, ASSIGNOR OF ONE-THIRD TO ALBERT JAMES OWEN AND ONE-THIRD TO HARRY GROEME VASSALL, BOTH OF BRISTOL, ENGLAND.

HAND-PROPELLED TRUCK, TROLLEY, AND THE LIKE.

Application filed September 5, 1922. Serial No. 586,184.

*To all whom it may concern:*

Be it known that I, WILLIAM GEORGE HARRIS, of Bristol, England, a subject of the King of Great Britain and Ireland, have invented certain new and useful Improvements in or Relating to Hand-Propelled Trucks, Trolleys, and the like, of which the following is a specification.

This invention relates to hand propelled trucks, trolleys and the like and has for its object to provide an improved construction giving ease of movement and freedom from wheel drag which is so damaging to floors.

According to this invention the chassis of the truck comprises a frame, three or more wheel units rotatably mounted on the frame, a table or platform on which the tray or bin constituting the goods receptacle is carried rotatably mounted on the frame, means for turning the wheel units simultaneously in the same direction by turning the table or platform, and means may be provided for enabling the wheels to adapt themselves to the inequalities of the ground.

In one form of truck made in accordance with this invention four pairs of wheels mounted on axles are used. The axles are pivotally mounted on brackets which are rotatably mounted on a frame so that lines joining their centres of rotation would form a square.

On the shank of each bracket is mounted a gear wheel. An auxiliary frame is secured to the main frame by four bolts and spaced therefrom which bolts form bearings for four intermediate wheels. Each intermediate wheel meshes with one of the wheels on the brackets. A table or platform is rotatably mounted in bearings in the frame and main frame and is provided with a gear wheel which meshes with the four intermediate gear wheels. The table is adapted to receive a bin or tray which is secured thereto in any suitable manner.

Referring to the drawings filed herewith:—

Fig. 3 is a diagonal section.

In the form shown in the drawings:

Figure 1:
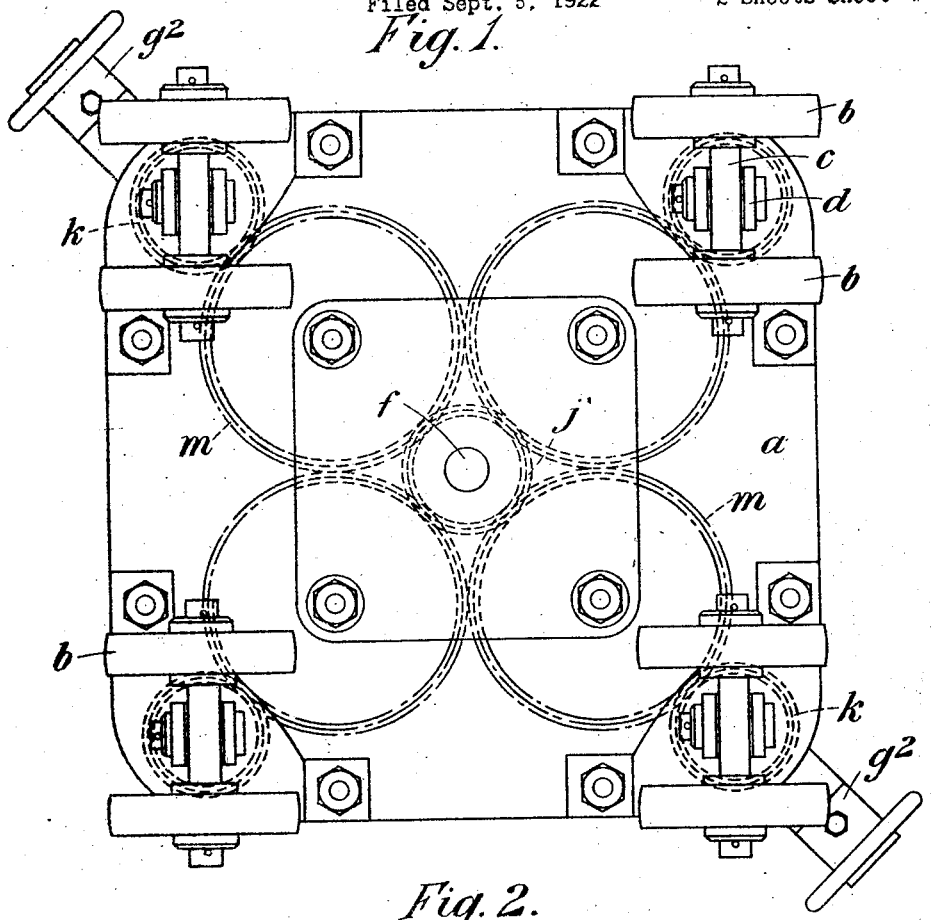
Fig. 1 is a plan from underneath of one form of truck made in accordance with this invention.
Figure 2:
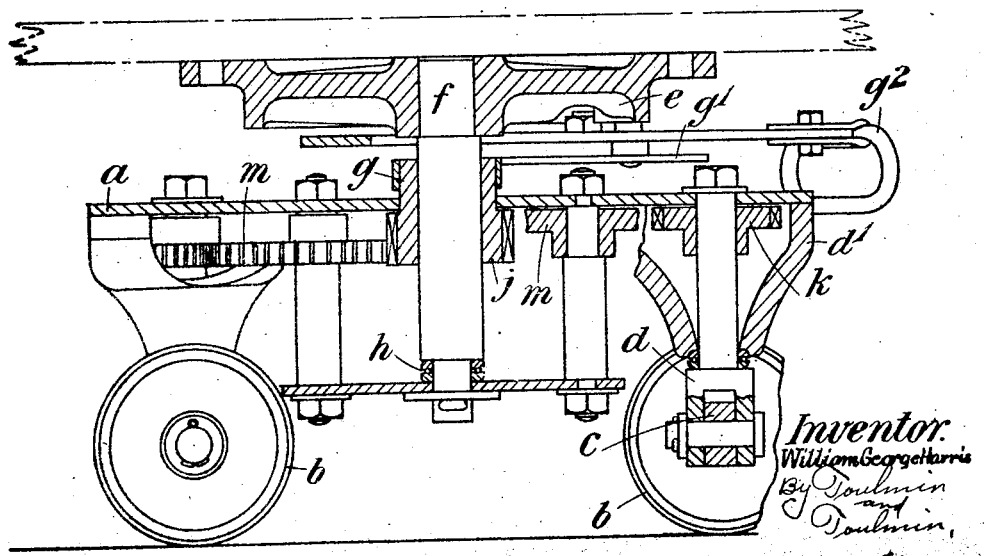
Fig. 2 is a sectional elevation of Fig. 1.

$a$ is the frame, eight wheels $b$ are mounted in pairs on axles $c$. The axles $c$ are pivotally secured to forked brackets $d$ which are pivotally mounted in the frame $a$. The table $e$ is rotatably mounted by its spindle $f$ in a sleeve $g$ in the frame, and is provided with a thrust bearing $h$. The bearing $g$ is rotatably mounted in the frame $a$ and carries a gear wheel $j$. Gear wheels $k$ are fixed on the shanks of the forked brackets $d$. Intermediate gear wheels $m$ are mounted on the frame and mesh with the wheel $j$ and the wheels $k$.

On the upper end of the bearing $g$ are arms $g'$ and slidably mounted on the arms $g'$ is a clutch lever $g^2$ provided with a dog $g^3$ which engages with a notch $q^4$ on the underside of the table $e$. When the dog $g^3$ is in the slot $g^4$ then on rotating the bin and with it the wheel $j$ the wheels $b\ b$ are rotated on their spindles, but when the dog $g^3$ is out of the slot $g^4$ then the wheels can be rotated on their spindles by turning the clutch lever $g^2$ and without rotating the bin or wheel $j$. One arm $g'$ is provided with a lug $g^5$ and the clutch lever $g^2$ carries lugs $g^6$ and return springs $g^7$. The other arm $g'$ carries a pin $g^8$ and acts as a guide to the other end of the clutch lever which is provided with a slot $g^9$ to engage with the pin $g^8$. The clutch can be disengaged by sliding the clutch lever in either direction.

The axles $c$ of all the wheels turn simultaneously on turning the clutch lever or if the clutch is engaged on turning the bin, table or platform, and no damage will be caused to the floor, however highly finished it may be by dragging of any of the wheels.

In use all the wheels will lie in the same direction and the truck is guided by turning the clutch lever or the bin or table or platform. The gear wheels on the forked brackets and the gear wheel on the table spindle are preferably all the same size. The axles of the wheels are pivoted to the forked brackets so that the wheels may rock, or tilt laterally, to conform with any inequalities in the floor.

Chain gearing may be used in the place of the gear wheels.

What I claim and desire to secure by Letters Patent is:—

1. A hand-propelled truck comprising, in combination, a non-rotatable frame, at least three brackets turnably mounted about pivots on said frame, a transport wheel carried by each said bracket, a gear-wheel mounted on each of said bracket-pivots, a shaft rotatably supported on, and centrally of, said frame with one end projecting beyond the frame, a sleeve rotatably positioned on said frame and about said shaft, a gear-wheel on said sleeve, idle gear-wheels corresponding in number with said brackets and each mounted on said frame adjacent a bracket and adapted to gear with the gear-wheel on said sleeve and with the gear-wheel of the adjacent bracket, a table superimposed above said frame and rotatably mounted on said central shaft, means for clutching said table to, and declutching it from, said sleeve and adapted to operate the sleeve, and a platform on said table adapted to actuate said sleeve through said clutching and declutching means.

2. A hand-propelled truck comprising, in combination, a non-rotatable frame, at least three brackets turnably mounted about pivots on said frame, a transport wheel carried by each said bracket, a gear-wheel mounted on each of said bracket-pivots, a shaft rotatably supported on, and centrally of, said frame with one end projecting beyond the frame, a sleeve rotatably positioned on said frame and about said shaft, a gear-wheel on said sleeve, idle gear-wheels corresponding in number with said brackets and each mounted on said frame adjacent a bracket and adapted to gear with the gear-wheel on said sleeve and with the gear-wheel of the adjacent bracket, a table superimposed above said frame and rotatably mounted on said central shaft, means for clutching said table to, and declutching it from, said sleeve and adapted to operate the sleeve, said means comprising arms on, and projecting from, said sleeve, a lever slidably mounted on said arms, a handle at each end of said lever, a member on said lever adapted to engage and disengage a slot in said table, and a platform on said table capable of actuating said sleeve through said clutching and declutching means when subjected to manual effort.

3. A hand-propelled truck comprising, in combination, a non-rotatable frame, at least three brackets turnably mounted about pivots on said frame, a transport wheel carried by each said bracket, a gear-wheel mounted on each of said bracket-pivots, a shaft rotatably supported on, and centrally of, said frame with one end projecting beyond the frame, a sleeve rotatably positioned on said frame and about said shaft, a gear-wheel on said sleeve, idle gear-wheels corresponding in number with said brackets and each mounted on said frame adjacent a bracket and adapted to gear with the gear-wheel on said sleeve and with the gear-wheel of the adjacent bracket, a table superimposed above said frame and rotatably mounted on said central shaft, means for clutching said table to, and declutching it from, said sleeve and adapted to operate the sleeve, said means comprising arms on, and projecting from, said sleeve, an abutment on one of said arms, a lever slidably mounted on said arms, spaced abutments on said lever complementary to said abutment on said sleeve-arm, a spring interposed between said sleeve-arm abutment and each of said lever abutments, a handle at each end of said lever, a dog on said lever adapted to engage and disengage a slot in said table, and a platform on said table capable of actuating said sleeve through said clutching and declutching means when subjected to manual effort.

In testimony whereof, I affix my signature.

WILLIAM GEORGE HARRIS